(12) United States Patent
Bergström et al.

(10) Patent No.: US 8,215,671 B2
(45) Date of Patent: Jul. 10, 2012

(54) AIR-BAG FOR A MOTOR VEHICLE

(75) Inventors: Johanna Bergström, Göteborg (SE); Mikael Dahlgren, Alingsås (SE)

(73) Assignee: Autoliv Development AB, Vargarda (SE)

( * ) Notice: Subject to any disclaimer, the term of this patent is extended or adjusted under 35 U.S.C. 154(b) by 359 days.

(21) Appl. No.: 12/526,205

(22) Filed: Aug. 6, 2009

(65) Prior Publication Data
US 2010/0045007 A1    Feb. 25, 2010

(51) Int. Cl.
*B60R 21/231*    (2011.01)
(52) U.S. Cl. ..................... 280/743.2; 280/729
(58) Field of Classification Search ................ 280/729, 280/728.1, 731, 743.2, 740
See application file for complete search history.

(56) References Cited

U.S. PATENT DOCUMENTS

| | | | | |
|---|---|---|---|---|
| 3,929,350 A * | 12/1975 | Pech | | 280/729 |
| 3,970,328 A * | 7/1976 | Wallsten | | 280/731 |
| 5,240,283 A * | 8/1993 | Kishi et al. | | 280/729 |
| 5,732,973 A * | 3/1998 | Turnbull et al. | | 280/743.1 |
| 5,901,979 A * | 5/1999 | Schneider et al. | | 280/738 |
| 5,927,748 A * | 7/1999 | O'Driscoll | | 280/729 |
| 6,554,313 B2 * | 4/2003 | Uchida | | 280/729 |
| 6,786,505 B2 * | 9/2004 | Yoshida | | 280/729 |
| 6,851,706 B2 * | 2/2005 | Roberts et al. | | 280/730.1 |
| 6,916,039 B2 * | 7/2005 | Abe | | 280/729 |
| 6,929,285 B2 * | 8/2005 | Yamada et al. | | 280/743.2 |
| 7,195,276 B2 * | 3/2007 | Higuchi | | 280/730.1 |
| 7,334,812 B2 * | 2/2008 | Abe | | 280/729 |
| 7,354,063 B2 * | 4/2008 | Keshavaraj | | 280/743.1 |
| 7,445,232 B2 * | 11/2008 | Takimoto | | 280/729 |
| 7,448,644 B2 * | 11/2008 | Zhong et al. | | 280/729 |
| 7,475,904 B2 * | 1/2009 | Hofmann et al. | | 280/739 |
| 7,510,987 B2 * | 3/2009 | Okada | | 442/195 |
| 7,631,891 B2 * | 12/2009 | Washino | | 280/731 |
| 7,654,561 B2 * | 2/2010 | Webber et al. | | 280/729 |
| 7,712,770 B2 * | 5/2010 | Kalliske et al. | | 280/729 |
| 7,758,069 B2 * | 7/2010 | Enders | | 280/732 |
| 7,766,385 B2 * | 8/2010 | Fukawatase et al. | | 280/743.2 |
| 7,850,200 B2 * | 12/2010 | Zauritz et al. | | 280/740 |
| 7,878,533 B2 * | 2/2011 | Shimazaki et al. | | 280/731 |
| 7,878,538 B2 * | 2/2011 | Abe et al. | | 280/739 |
| 7,914,041 B2 * | 3/2011 | Aranzulla et al. | | 280/743.2 |
| 7,963,550 B2 * | 6/2011 | Hong et al. | | 280/730.1 |
| 7,967,098 B2 * | 6/2011 | Choi | | 180/274 |
| 2002/0149187 A1 * | 10/2002 | Holtz et al. | | 280/749 |
| 2003/0116945 A1 * | 6/2003 | Abe | | 280/729 |
| 2003/0178831 A1 * | 9/2003 | Roberts et al. | | 280/743.1 |
| 2003/0214121 A1 * | 11/2003 | Miyata et al. | | 280/730.1 |

(Continued)

FOREIGN PATENT DOCUMENTS
CA    2 361 732 A1    4/2003
(Continued)

*Primary Examiner* — Paul N Dickson
*Assistant Examiner* — Nicole Verley
(74) *Attorney, Agent, or Firm* — Harness, Dickey & Pierce, P.L.C.

(57) ABSTRACT

An air-bag for use in a safety arrangement in a motor vehicle includes a front panel and a rear panel. The two panels are superimposed and attached to one another around their peripheries in order to define an inflatable chamber. The front panel is provided with an aperture within which is secured an additional panel. The additional panel has an area greater than the aperture and is configured so as to define a plurality of adjacent substantially wave-shaped projections which extend forwardly from the front panel when the air-bag is inflated.

14 Claims, 6 Drawing Sheets

U.S. PATENT DOCUMENTS

| | | | |
|---|---|---|---|
| 2004/0155440 A1* | 8/2004 | Hasebe et al. | 280/729 |
| 2005/0110257 A1* | 5/2005 | Cohen | 280/743.1 |
| 2006/0273556 A1* | 12/2006 | Breed et al. | 280/728.1 |
| 2007/0001433 A1* | 1/2007 | Gu et al. | 280/729 |
| 2007/0052222 A1* | 3/2007 | Higuchi et al. | 280/738 |
| 2007/0205591 A1* | 9/2007 | Bito | 280/743.2 |

FOREIGN PATENT DOCUMENTS

| | | |
|---|---|---|
| EP | 1 362 777 A2 | 11/2003 |
| EP | 1 439 096 A1 | 7/2004 |
| EP | 1 516 785 A | 3/2005 |

* cited by examiner

AIR-BAG FOR A MOTOR VEHICLE

CROSS-REFERENCE TO RELATED APPLICATIONS

This application is a 371 U.S. National Stage of International Application No. PCT/GB2007/000507, filed Feb. 14, 2007, the disclosures of which are entirely incorporated herein by reference.

FIELD

THE PRESENT INVENTION relates to an air-bag for a motor vehicle and, more particularly, relates to an inflatable air-bag of the type suitable for use as a safety device in a motor vehicle.

BACKGROUND

Occupant protection arrangements for motor vehicles which comprise an inflatable air-bag are now very well known and serve to reduce, and ideally eliminate, injury to an occupant of a motor vehicle in the event of an accident involving a crash. Air-bags of this general type are inflated upon receipt of a signal indicative of a crash situation, the signal being generated by a crash sensor located elsewhere in the motor vehicle, so as to inflate, thereby providing a relatively soft restraint for an occupant of the motor vehicle.

Research has shown that as an occupant of a motor vehicle impacts with an inflated air-bag, which is typically inflated by a very high pressure of gas, two principal forces serve to act on the occupant. One of these forces results from the pressure of gas within the air-bag, and the other arises from so-called "membrane forces". These membrane forces result from frictional resistance to the relative movement of the warp and weft yarns of the air-bag fabric, as the fabric is subjected to tension across the front surface of the inflate air-bag.

It has also been found that whilst the chest/sternum area of the human body is relatively resilient to these forces created in an inflating air-bag, due to the natural stiffness of the human body in this area, the head and neck region of the human body is significantly more vulnerable to injury as a result of these forces in an air-bag. It has therefore been found to be desirable to reduce the aforementioned membrane forces in the region of an air-bag which is likely to be impacted by the head of a vehicle occupant so as to reduce the overall force applied to the head and neck region of the occupant, whilst providing a lower region of the air-bag with a configuration susceptible to relatively large membrane forces, the lower region of the air-bag being provided to provide restraint to the chest/sternum region of a vehicle occupant.

EP1439096A1 discusses the concept of membrane forces in more detail, and in order to address the problem of potential neck injuries as a result of the membrane forces in an inflating air-bag, proposes an air-bag using seams, straps or ribbons to create a relatively "soft" wavy front surface on the air-bag. However, it has been found that a problem with the arrangement of EP1439096A1 is that the indentations provided between the adjacent waves of the relatively soft front surface, do not have a constant depth, with the result that the wavy area of the front surface is deeper in the middle portion than at its edges. The effect of this is that the membrane force-reducing effects of this prior art arrangement are different in different areas of the front surface of the air-bag, being better in the middle of the front surface than at its periphery.

SUMMARY

It is an object of the present invention to provide an improved air-bag for a motor vehicle.

Accordingly, the present invention provides an air-bag for a motor-vehicle, the air-bag comprising a plurality of panels attached to one another to define an inflatable chamber having a front surface, a rear part of the inflatable chamber having a gas-inlet configured to receive part of an inflator, the air-bag being characterised in that the front surface is provided with an aperture having a peripheral edge to which is secured an edge of an additional panel, the additional panel having an area greater than the aperture, and being configured so as to define a plurality of adjacent substantially wave-shaped projections having an inflated shape which extends forwardly from the front surface when the air-bag is inflated.

Preferably, each said wave-shaped projection defines a wall which extends substantially perpendicularly from the front surface when the air-bag is inflated.

Conveniently, each said wall is defined by at least one fold, tuck, or dart provided in the additional panel.

Advantageously, the inflated shape of the or each pair of adjacent wave-shaped projections is created, at least in-part, by a strap having one end attached to part of the additional panel between the two respective wave-shaped projections, the strap being arranged to restrict movement of said part of the additional panel away from the rear part of the inflatable chamer during inflation of the air-bag.

Conveniently, the aperture, and the additional panel within the aperture, are provided in the upper-half of the air-bag when in an inflated state, for impact with the head of an occupant of the motor vehicle.

Preferably, each said panel is of fabric material.

Conveniently, the air-bag comprises a front panel and a rear panel, the front panel defining the front surface.

Advantageously, the additional panel is orientated relative to the front panel such that the warp and weft yarns of the additional panel lie at an acute angle to the warp and weft yarns of the front panel.

Conveniently, the front panel is orientated relative to the rear panel such that the warp and weft yarns of the front panel lie at an acute angle to the warp and weft yarns of the rear panel.

Preferably, the or each said acute angle is substantially 45 degrees.

Advantageously, the air-bag is provided with an internal tether arranged to restrict movement of the front surface away from the rear surface during inflation of the air-bag.

Conveniently, the tether extends between the front and rear panels.

Preferably, each wave-shaped projection extends between 50 and 130 mm from the front surface when the air-bag is inflated.

DRAWINGS

So that the invention may be more readily understood, and so that further features thereof may be appreciated, embodiments of the invention will now be described, by way of example, with reference to the accompanying drawings, in which.

DETAILED DESCRIPTION

Figure 2:
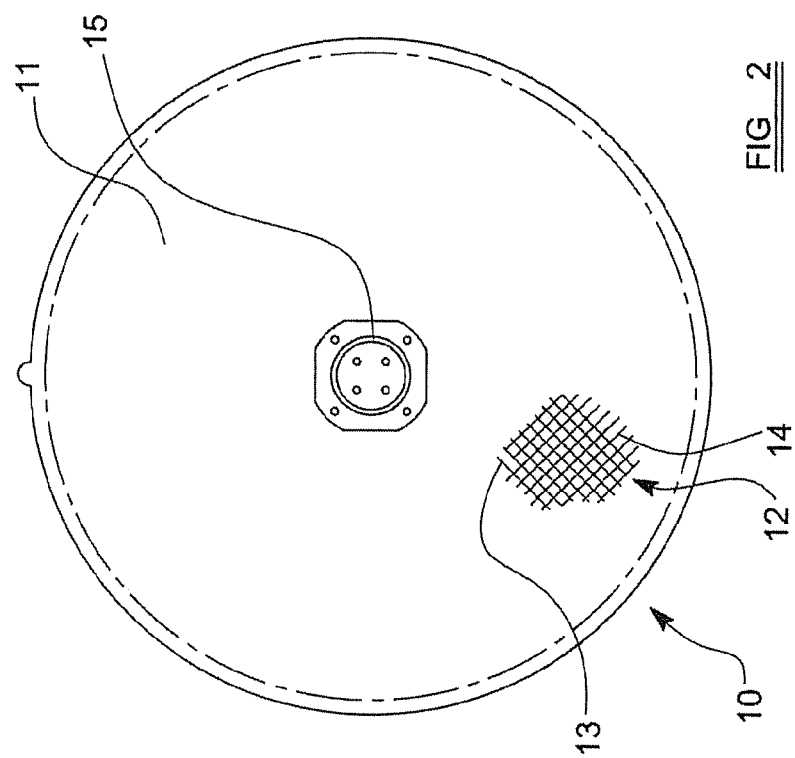
FIG. 2 is a plan view from above of a layer of fabric material forming the rear panel of the air-bag.
Figure 1:
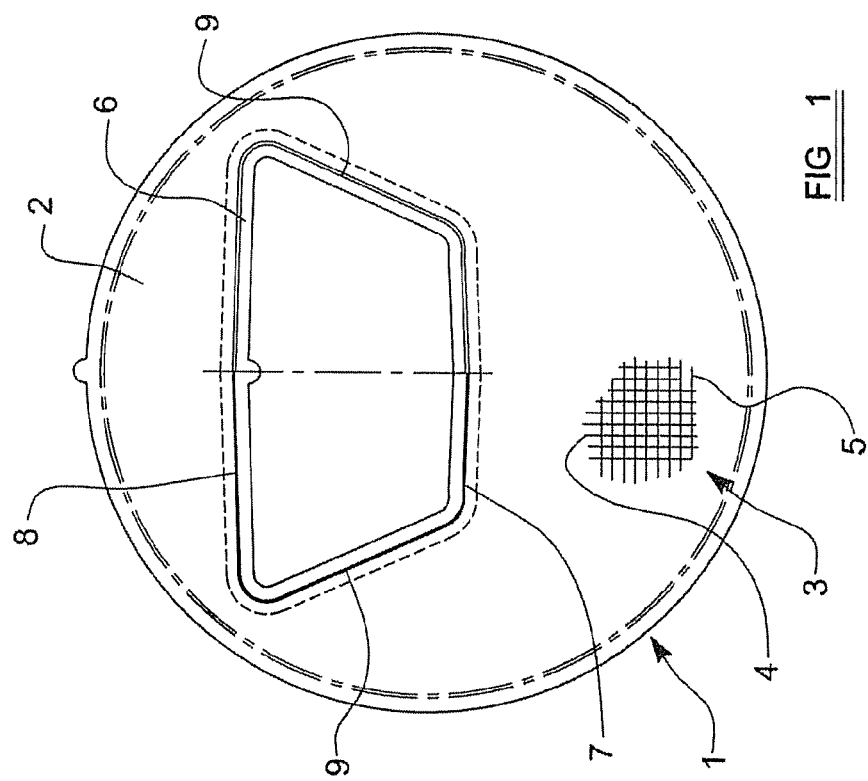
FIG. 1 is a plan view from above of a layer of fabric material forming the front panel of an air-bag in accordance with the present invention.

Referring initially to FIGS. 1 and 2 of the drawings, the invention will now be described in more detail.

FIG. 1 illustrates a sheet of woven fabric material 1, of generally circular form, which will define the front panel of an air-bag (that is the panel of the air-bag presented for impact with an occupant of the motor vehicle upon inflation). As illustrated schematically at 3, the warp yarns 4 and the weft yarns 5 of the fabric are arranged so as to run substantially vertically and horizontally respectively (in the orientation of the front panel 2 illustrated in FIG. 1). In the upper half of the front panel 2, an aperture 6 is cut from the fabric, the aperture being relatively large and sized so as to cover the region of the front panel 2 which is most likely to be impacted by the head of a 50 percentile male dummy.

In the preferred configuration illustrated in FIG. 1, the aperture 6 has a generally trapezoidal form having a relatively short lower edge 7 which runs substantially parallel with the horizontal weft yarns 5 of the fabric, and a relatively long upper edge 8 which is also arranged so as to extend substantially parallel with the weft yarns 5. Connecting the lower and upper edges 7,8 are a pair of side edges 9. It will therefore be seen that the aperture 6 is tapered so as to be narrower at its lower edge 7 than at its upper edge 8.

FIG. 2 illustrates a second fabric sheet 10, which is again of circular form, and which defines a rear panel 11 of the air-bag. The rear panel 11 is preferably of substantially equal overall dimension as the front panel 2. As illustrated schematically at 12, the fabric of the rear panel 11 is rotated relative to that of the front panel 2 illustrated in FIG. 1 such that its warp yarns 13 and the weft yarns 14 lie at an acute angle to the warp yarns 4 and the weft yarns 5 of the fabric defining the front panel 2. In the preferred arrangement, the warp and weft yarns 13, 14 of the rear panel 11 make an angle of substantially 45 degrees to the warp and weft yarns 4, 5 of the front panel 2.

In order to fabricate the air-bag of the present invention, the front panel 2 and the rear panel 11 will be attached to one another around their circular peripheral edges, preferably by generally conventional stitching, so as to define an inflatable chamber between the two panels. Arranging the warp and weft yarns of the two panels at an angle to one another is useful to ensure that when the air-bag is inflated, it adopts a generally round shape.

The central region of the rear panel 11 is provided with a gas inlet aperture 15 which is sized and configured to receive part of an inflator (not shown in FIG. 2), such as a conventional gas generator. When the air-bag arrangement is installed in a motor vehicle, the inflator will be arranged to receive a crash signal from a crash sensor (not shown), the signal being indicative of an accident situation and being effective to actuate the inflator, the inflator thus supplying high-pressure gas through the inlet aperture 15 and into the inflatable chamber defined between the two panels 2, 11.

Figure 3:
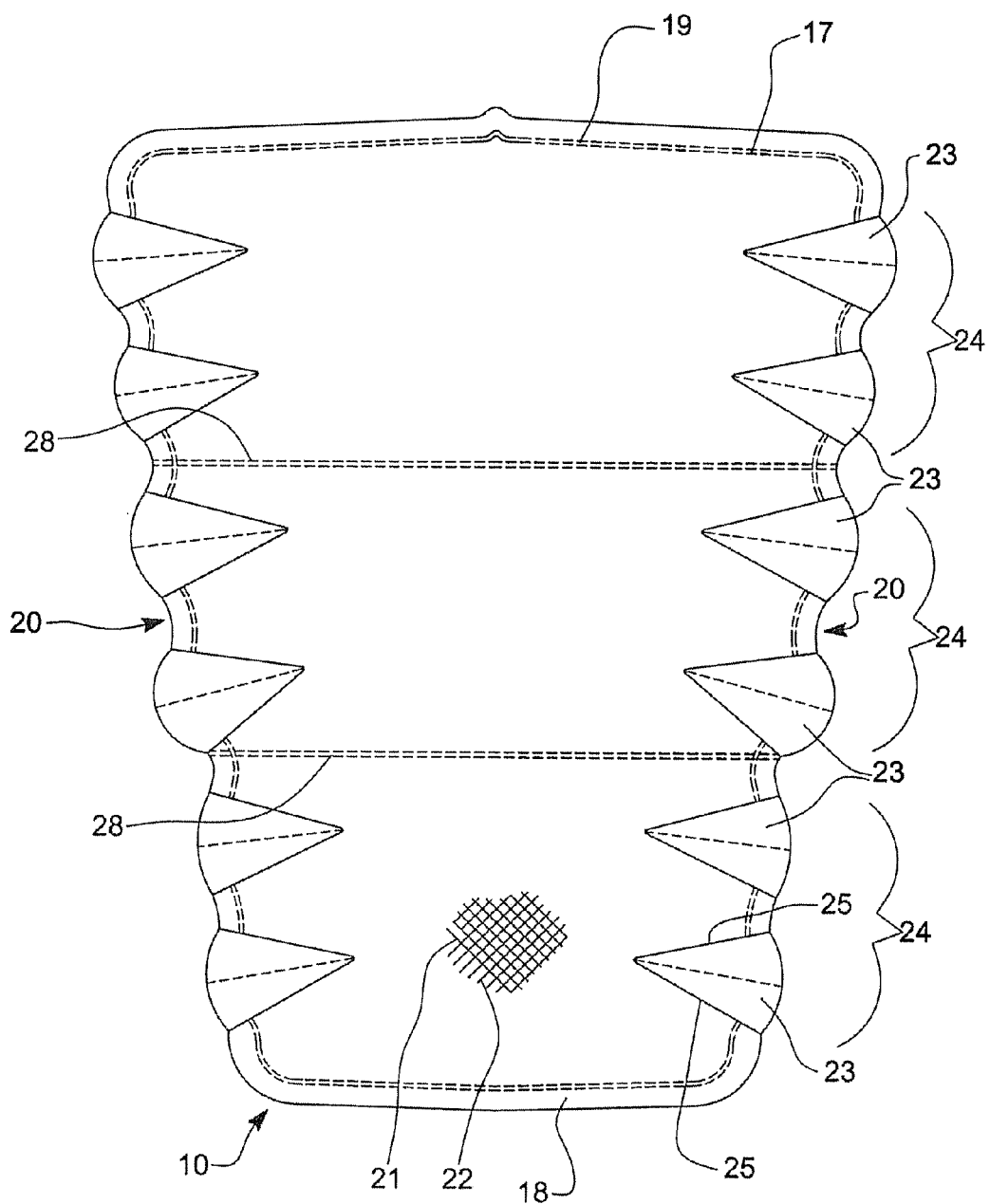
FIG. 3 is a plan view of a sheet of fabric material which forms an additional panel of the air-bag.

FIG. 3 illustrates a third sheet of fabric material 16 which will define an additional panel 17 of the air-bag and which, as will be described in more detail below, will be used to close the trapezoidal aperture 6 formed in the front panel 2. As such, the additional panel 17 has a generally complimentary trapezoidal shape, with a relatively short lower edge 18 and a relatively long, substantially parallel, upper edge 19, between which extend two side edges 20.

The fabric sheet 16 defining the additional panel 17 is orientated relative to the fabric of the front panel 2 such that its warp yarns 21 and its weft yarns 22 lie at an acute angle to the warp and weft yarns of the front panel 2. Most preferably, the warp and weft yarns 21, 22 of the additional panel 17 make an angle of substantially 45 degrees to the warp and weft yarns 4, 5 of the front panel 2. It will, of course, be appreciated that in such an arrangement, the warp and weft yarns, 21, 22 of the additional panel 17 will effectively lie substantially parallel with the warp and weft yarns 13, 14 of the rear panel 11. It has been found that arranging the warp and weft yarns 21, 22 of the additional panel 17 so as to lie at an acute angle to the warp and weft yarns 4, 5 of the front panel 2 allows a greater degree of movement of the warp and weft yarns 21, 22 relative to one another, thereby allowing the fabric of the additional panel 17 to stretch by a greater degree when it is impacted by the head of an occupant.

Each side edge 20 of the additional panel 17 is folded inwardly at a number of positions along its length so as to define a plurality of inwardly-directed darts 23 which are arranged in neighbouring pairs 24. Each dart 23 is formed by folding the fabric of the front panel 17 inwardly along a pair of diverging fold lines 25 whereupon the fabric in the region of one fold line 25 is then secured to the fabric in the region of the opposing fold line 25 by stitching, thereby creating an inwardly-directed tuck in the fabric.

Figure 4:
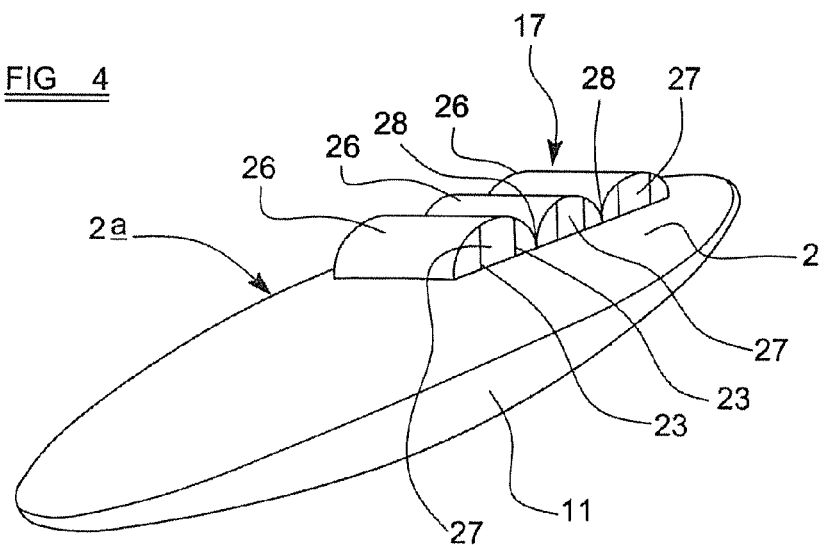
FIG. 4 is a perspective view from the front and one side, illustrating an air-bag formed from the three panels of FIGS. 1 to 3.

When all of the darts 25 have been folded and stitched up as described above, a three-dimensional shape is imparted to the front panel 17, the shape being shown most clearly in FIG. 4 which shows the peripheral edge of the front panel 17 secured to the peripheral edge of the aperture 6 provided in the front panel 2. The three-dimensional shape imparted to the additional panel 17 is generally "wavy", and is defined by a series of substantially wave-shaped projections 26 which extend forwardly from the front panel 2. Each pair 24 of inwardly-tucked darts 23 serve to create an end wall 27 at the end of a respective wave-shaped projection 26, the end walls 27 having a generally semi-circular profile.

Between neighbouring wave-shaped projections 26, a fold 28 is defined in the fabric of the additional panel 17, the positions of the folds 28 being illustrated more clearly in FIG. 3. The folds 28 extend across substantially the entire width of the additional panel 17.

Figure 5:
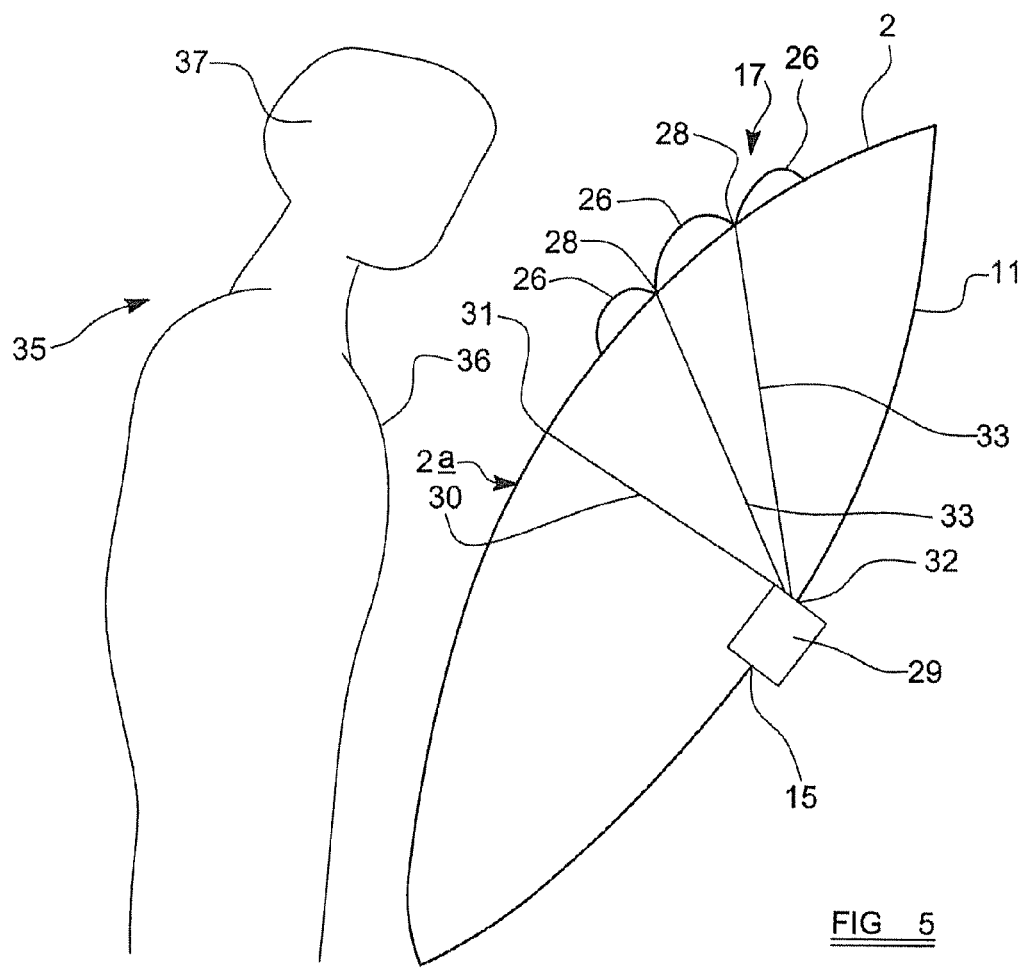
FIG. 5 is a schematic transverse cross-sectional view through the air-bag arrangement illustrated in FIG. 4.

FIG. 5 illustrates a cross-section of the air-bag, taken down a vertical axis of the air-bag, and showing the air-bag having been inflated by inflating gas from an inflator 29 received within the inlet aperture 15. It can therefore be seen that the front panel 2 defines a front surface 2a of the airbag which is presented for impact by an occupant of the motor vehicle.

An internal tether 30 is provided which is secured, at its foremost end 31, to the fabric defining the front panel 2, generally in the centre of the front panel 2. The rearward end 32 of the tether is secured, either to the inflator 29, or to the fabric defining the rear panel 11. The purpose of the internal tether 30 is to prevent the front panel 2 extending forwardly relative to the inflator 29 and the rear panel 11 to such a degree that the front panel 2 becomes excessively curved so as to deform the three-dimensional configuration imparted to the additional panel 17 as described above. It is important in operation of the invention that the fabric of the additional panel 17 is not subjected to excessive tensional forces as the air-bag inflates and the internal tether 30 serves to prevent this.

Figure 6:
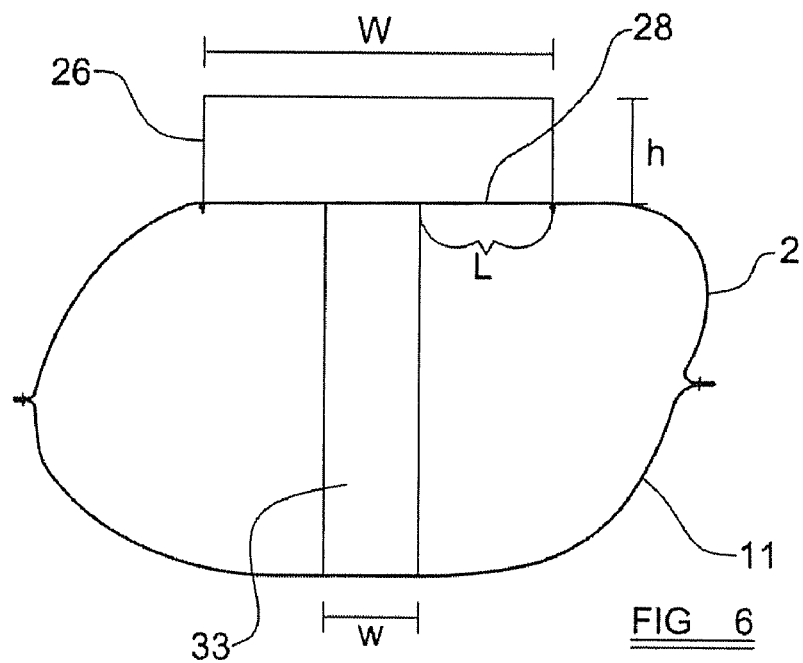
FIG. 6 is a schematic cross-sectional view through the air-bag, viewed from above, showing the air-bag in an inflated condition.

Also provided within the internal chamber of the air-bag are a number of straps 33. Each strap 33 extends between an anchor point at the rear of the air-bag (preferably provided on the inflator 29 or the rear panel 11) to a respective fold 28 lying between adjacent wave-shaped projections 26. As illustrated most clearly in FIG. 6, each strap 33 has a width w which is less than the overall width W of the respective fold 28 to which it is attached. Furthermore, the forwardmost end of each strap 33 is attached to the central region of its respective fold line 28 such that a region of the fold line 28 extends to either side of the strap 33, having a width L.

The purpose of the internal straps 33 is to prevent the three-dimensional shape of the front panel 17 being "blown-out". The straps 33 thus serve to restrict movement of the central parts of the fold lines 28 away from the rear panel 11 of the air-bag. The straps 33 can therefore be considered, at least in-part, to contribute (along with the darts 23) to the creation of the wave-shaped projections 26.

Figure 7:
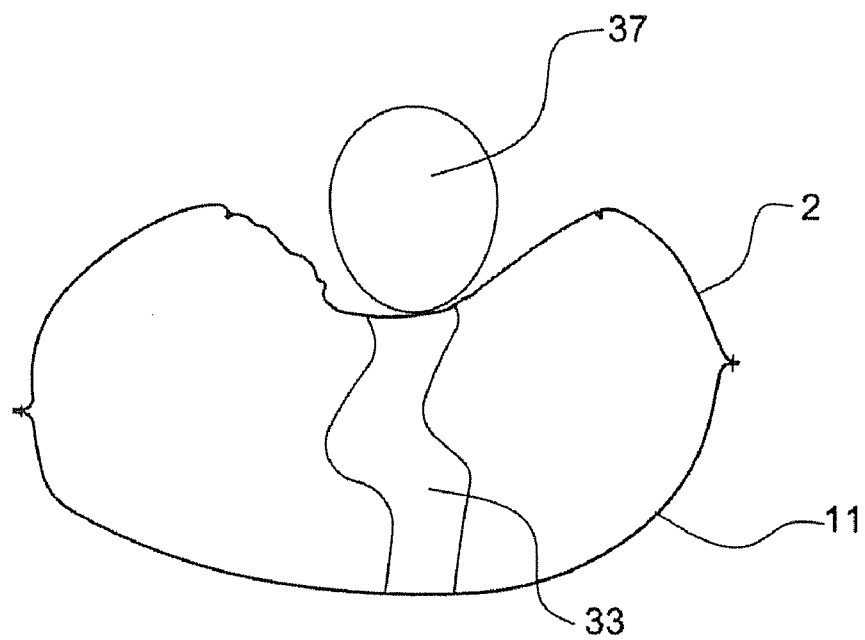
FIG. 7 is a view corresponding generally to that of FIG. 6, illustrating a head of a vehicle occupant impacting with the air-bag.

In a collision involving a motor vehicle equipped with the air-bag of the present invention, an occupant 35 of the motor vehicle will move towards the inflated air-bag under the effect of inertia. The front panel 2 and the additional panel 17 of the air-bag are arranged so that the occupant's chest/sternum 36 will strike the front panel 2 of the air-bag, below the additional panel 17, whilst the occupant's head will strike the additional panel 17. Gas pressure and membrane forces in the front panel 2 will serve to decelerate the occupant's chest/sternum area 26, whilst predominantly gas pressure will serve to decelerate the occupant's head, without a significant contribution from membrane forces within the additional panel 17. The wave-shaped projections 26 in the additional panel 17 are simply urged inside out, as illustrated in FIG. 7, by the impact of the occupant's head 37.

The structure of the additional panel 17 is such that relatively low fabric resistance initially occurs through impact with the occupant's head 37, which means that only very low, if any significant, membrane forces are applied to the head of the occupant. The result is that the head of the occupant is allowed to move into the inflated air-bag without experiencing significant fabric resistance until such point as tension is applied on the fabric yarns defining the additional panel 17, which occurs when the additional panel 17 is deformed sufficiently inwardly of the inflating air-bag such that its fabric begins to pull the front panel 2 inwards. It should therefore be appreciated that the longer the length L (i.e. the extent of each fold line 28 which is not secured to a restraining strap 33), then the later will be the instant at which the front panel 2 is pulled inwardly by the impacted additional panel 17, with the result that it will take longer before the head 37 is decelerated by the membrane forces accumulating within the fabric of the additional panel 17. Through experiment, it has been found that the preferred width w of the restraining straps 33 is 50 mm wide at the point at which it is attached to the respective wave fold 28. Whilst a wider strap, perhaps even as wide as the entire additional panel 17, would serve to maintain the same height h along the entire extent of each projection 26, it would also result in the accumulation of membrane forces from tension within the fabric of the additional panel 17 at an earlier instant.

Figure 8:
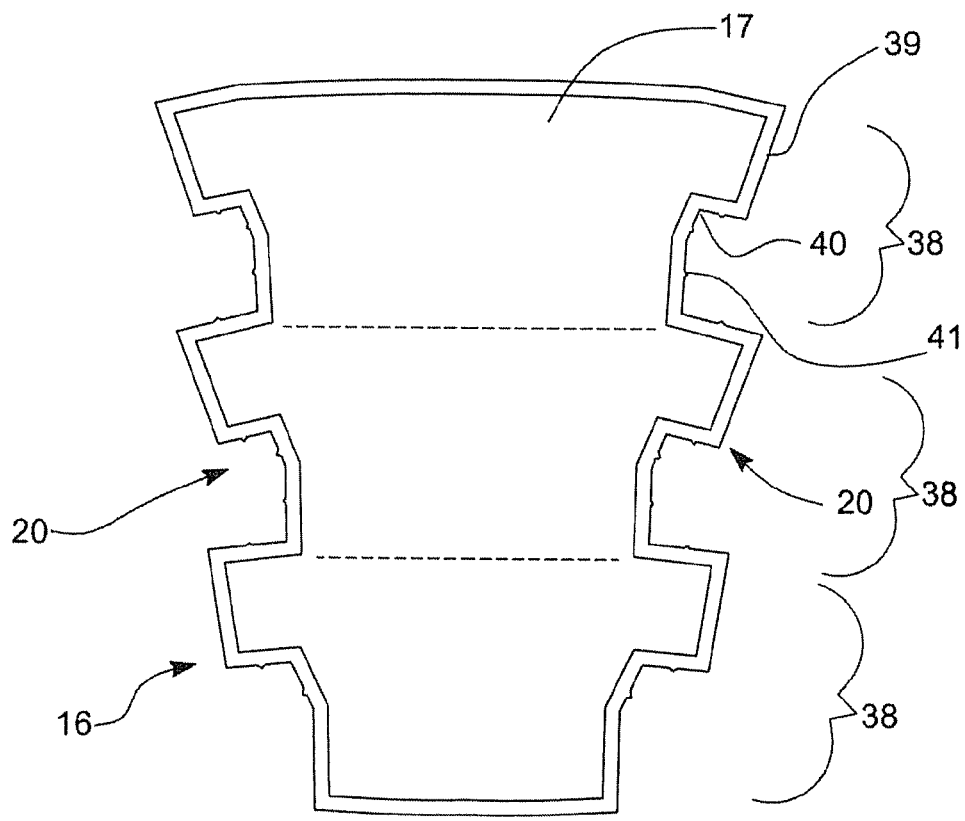
FIG. 8 illustrates an alternative form for the additional panel.

FIG. 8 illustrates an alternative form for the fabric sheet 16 which is used to define the additional panel 17. In this arrangement, the fabric sheet 16 is again generally trapezoidal, but instead of being manipulated so that parts of its side edges 20 are tucked inwardly in the form of the darts, in this arrangement, the side edges 20 of the fabric sheet 16 are provided with a repeating series of stepped edge regions 38. Each edge region 38 comprises an outer edge portion 39 which is stepped inwardly, at 40, at its lower end so as to define an inner edge portion 41. In order to impart the necessary three-dimensional shape to the additional panel 17, the edge regions 38 are manipulated so as to bring together respective outer edge portions 39 and inner edge portions 41, whereupon the outer edge portions 39 are secured to respective inner edge portions 41 by stitching. In this manner, the stepped part 40 of each fold region 38 becomes folded inwardly and is then also stitched up.

Figure 9:
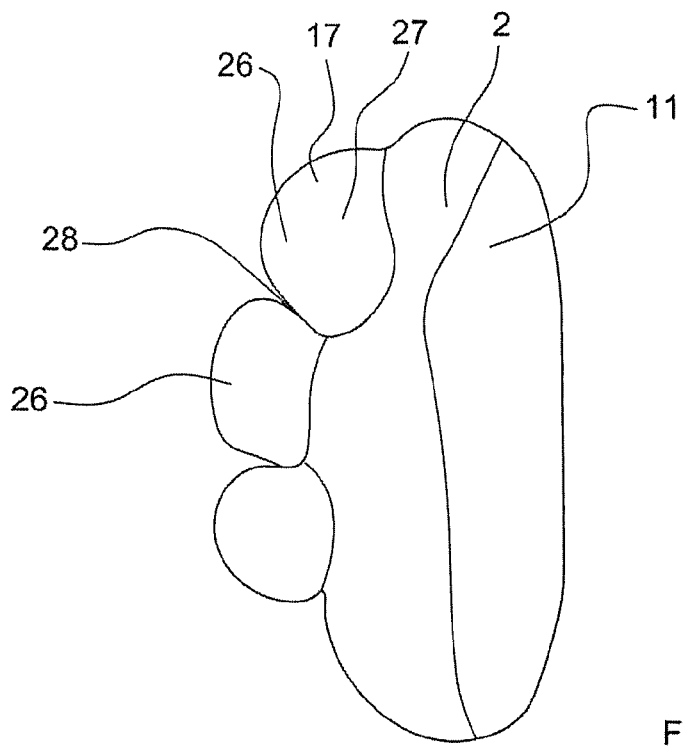
FIG. 9 is a side view of an air-bag incorporating the side panel of FIG. 8, in an inflated condition.

The resulting three-dimensional shape imparted to the front panel 17 is illustrated in FIG. 9. It will be seen that the front panel 17 again comprises a series of generally wave-shaped projections 26 separated from one another by wave-folds 28, the only significant difference being a slightly different profile for each end wall 27.

Figure 10:
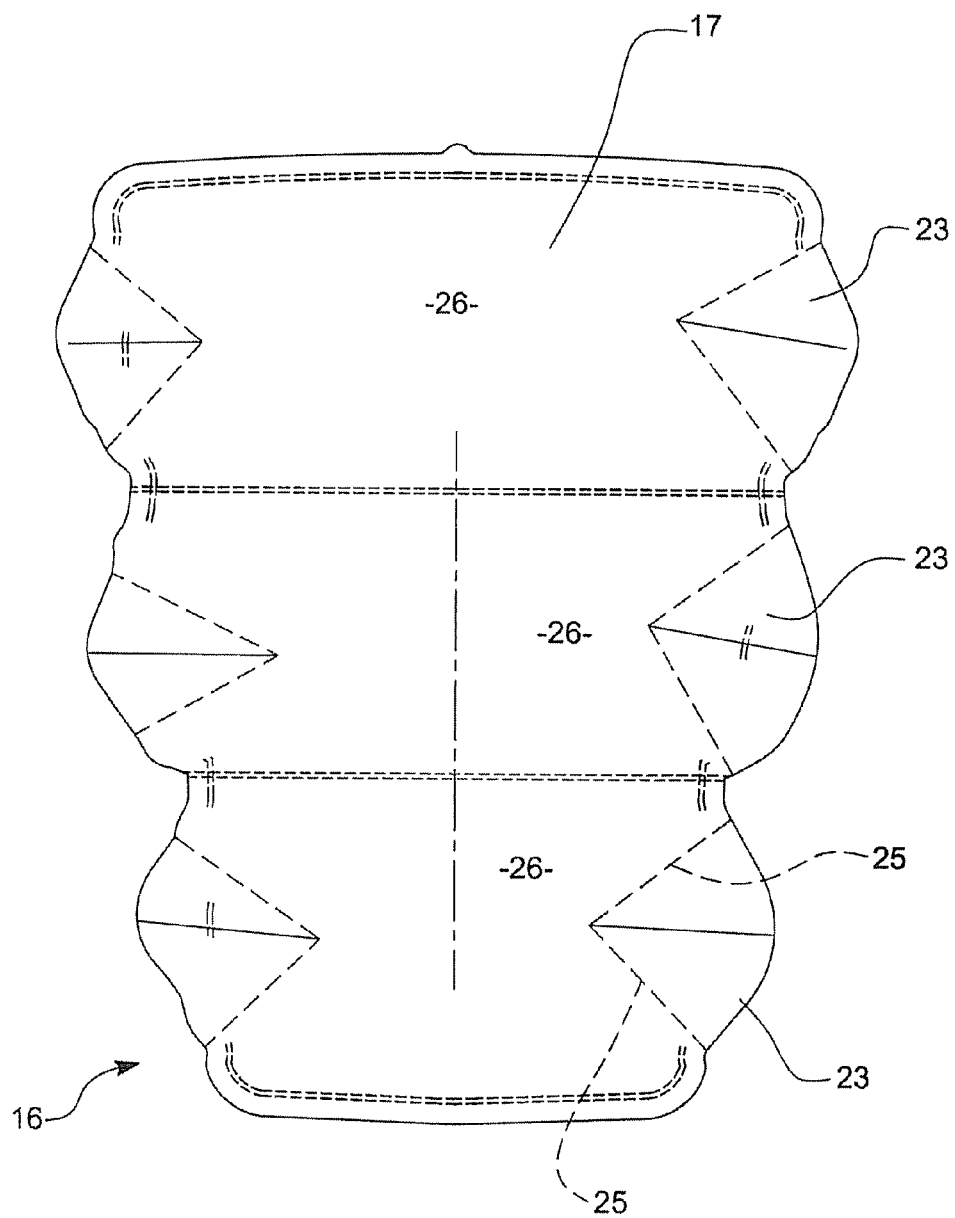
FIG. 10 illustrates another alternative form for the additional panel.

FIG. 10 illustrates another alternative form for the fabric sheet 16 which is used to define the front panel 17. In this arrangement, the fabric sheet 16 is generally similar in many respects to that illustrated in FIG. 3. The principal difference in the arrangement of FIG. 10 is that a fewer number of darts 23 are created, the darts in this arrangement not being arranged in pairs, and being larger than those of the arrangement in FIG. 3. Each dart 23 is again formed by folding a region of fabric inwardly about fold lines 25, whereupon the fabric in the region of the opposing fold lines 25 is then stitched together. In this arrangement, the end walls 27 of each wave-shaped projection 26 comprise only a single dart 23, whereas in the arrangement of FIG. 3, each end wall 27 incorporated two darts 23 arranged in a pair 24.

Through experiment, it has been found that the preferred height h of the wave-shaped projections 26, is somewhere in the range of 50-130 mm. Most preferably, the height h of the waves 26 is between 70 and 110 mm. It is also preferred that the end walls 27 of each wave-shaped projection 26 extend substantially perpendicularly relative to the front panel 2 of the air-bag when the air-bag is inflated.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. An inflatable air-bag comprising:
   an inflatable chamber defined by a front surface attached to a rear panel;
   a rear part of the inflatable chamber having a gas inlet configured to receive part of an inflator,
   the front surface provided with an aperture having a peripheral edge; and an additional panel having an edge secured to the peripheral edge of the aperture of the front surface, the additional panel having an area greater than the aperture and configured to define a plurality of adjacent, substantially wave-shaped projections having an inflated shape which extends forwardly from the front surface when the air-bag is inflated.

2. The inflatable air-bag according to claim 1, wherein each wave-shaped projection defines a wall which extends substantially perpendicularly from the front surface when the air-bag is inflated.

3. The inflatable air-bag according to claim 2, wherein each wall is defined by at least one fold, tuck, or dart provided in the additional panel.

4. The inflatable air-bag according to claim 1, wherein the aperture, and the additional panel within the aperture, are provided in the upper-half of the air-bag when in an inflated state, for impact with the head of an occupant of the motor vehicle.

5. The inflatable air-bag according to claim 1, wherein the plurality of panels includes a front panel and a rear panel, both of the front and rear panels constructed of fabric including warp and weft yarns, the additional panel orientated relative to the front panel such that the warp and weft yarns of the additional panel lie at an acute angle to the warp and weft yarns of the front panel.

6. The inflatable air-bag according to claim 5, wherein the acute angle is substantially 45 degrees.

7. The inflatable air-bag according to claim 1, further comprising an internal tether arranged to restrict movement of the front surface away from the rear part of the inflatable chamber during inflation of the air-bag.

8. The inflatable air-bag according to claim 1, wherein each wave-shaped projection extends between 50 and 130 mm from the front surface when the air-bag is inflated.

9. An air-bag for a motor-vehicle, comprising:
a plurality of panels attached to one another to define an inflatable chamber having a front surface, a rear part of the inflatable chamber having a gas inlet configured to receive part of an inflator, the front surface provided with an aperture having a peripheral edge to which is secured an edge of an additional panel, the additional panel having an area greater than the aperture and configured so as to define a plurality of adjacent, substantially wave-shaped projections having an inflated shape which extends forwardly from the front surface when the air-bag is inflated;
wherein an inflated shape of the or each pair of adjacent wave-shaped projections is created, at least in-part, by a strap having one end attached to part of the additional panel between the two respective wave-shaped projections, the strap being arranged to restrict movement of the part of the additional panel away from the rear part of the inflatable chamber during inflation of the air-bag.

10. The inflatable air-bag according to claim 9, wherein the plurality of panels includes a front panel and a rear panel, the front panel defining the front surface.

11. The inflatable air-bag according to claim 9, wherein each panel is of fabric material.

12. The inflatable air-bag according to claim 9, wherein the plurality of panels includes a front panel and a rear panel, both of the front and rear panels constructed of fabric including warp and weft yarns, the front panel is orientated relative to the rear panel such that the warp and weft yarns of the front panel lie at an acute angle to the warp and weft yarns of the rear panel.

13. The inflatable air-bag according to claim 12, wherein the acute angle is substantially 45 degrees.

14. The inflatable air-bag according to claim 12, further comprising a tether extending between the front and rear panels.

* * * * *